No. 687,173.  
C. UPTON.  
VARIABLE GEARING.  
(Application filed Mar. 18, 1901.)  
Patented Nov. 19, 1901.
(No Model.)
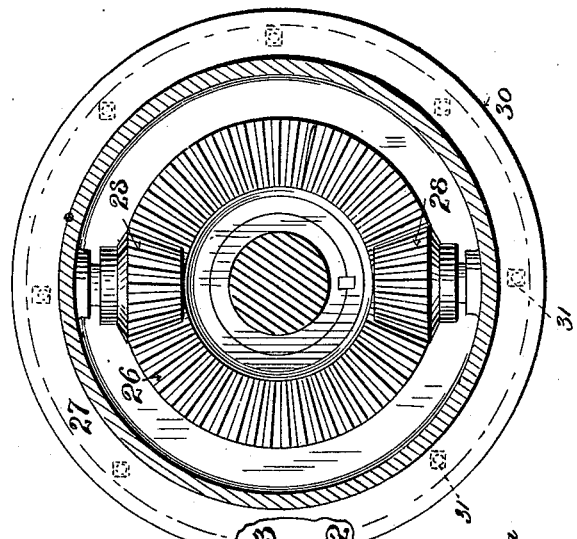
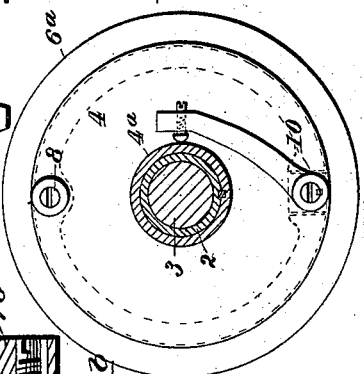
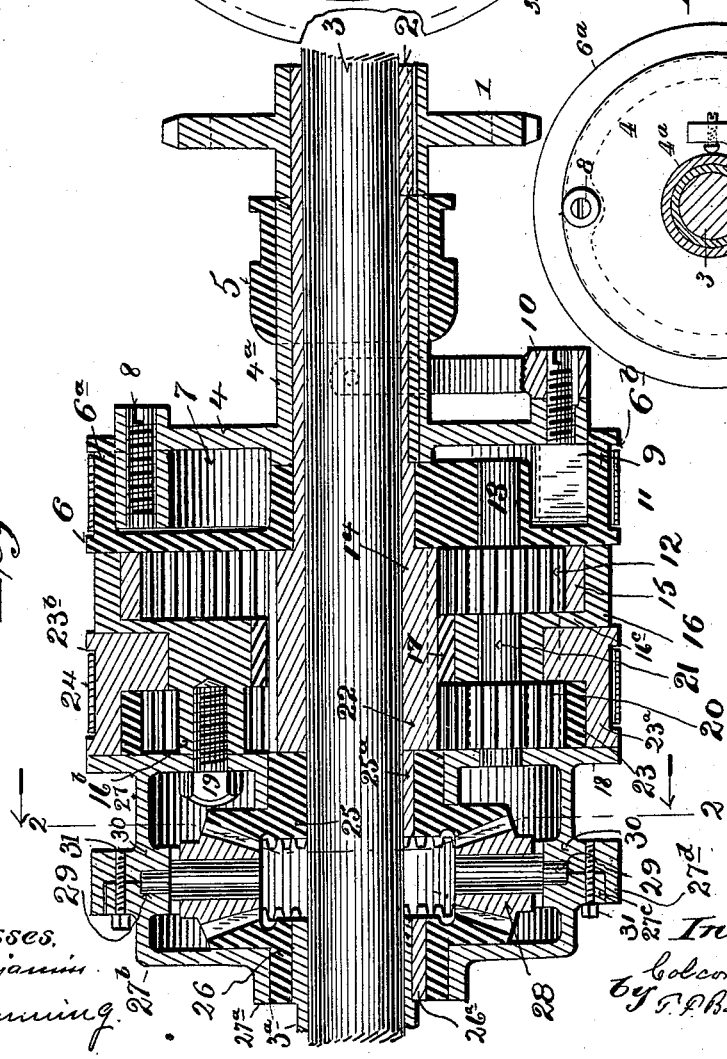
Witnesses.  
C. W. Benjamin  
M. Manning
Inventor:  
Colcord Upton  
by T. P. Bourne  
his Atty
THE NORRIS PETERS CO., PHOTO-LITHO., WASHINGTON, D. C.

UNITED STATES PATENT OFFICE.

COLCORD UPTON, OF BEVERLY, MASSACHUSETTS, ASSIGNOR TO THE UPTON MACHINE COMPANY, A CORPORATION OF NEW YORK.

VARIABLE GEARING.

SPECIFICATION forming part of Letters Patent No. 687,173, dated November 19, 1901.

Application filed March 18, 1901. Serial No. 51,644. (No model.)

*To all whom it may concern:*

Be it known that I, COLCORD UPTON, a citizen of the United States, residing in Beverly, Essex county, State of Massachusetts, have invented and produced certain new and useful Improvements in Variable Gearing, of which the following is a specification.

The object of my invention is to provide gearing in compact form with the parts in substantial alinement adapted to transmit motion in opposite directions as required from a main driver to the parts to be driven and wherein the latter are permitted to have differential motion.

In carrying out my invention I provide a driving part and a pair of driven parts, between which driving and driven parts are interposed gearing for producing rotation of the driven parts in the same direction as that of the driving part, as well as in the reverse direction, and differential gearing adapted to permit the driven parts to rotate at different speeds in opposite directions.

The invention further consists in the novel details of improvement, that will be more fully hereinafter set forth and then pointed out in the claims.

Reference is to be had to the accompanying drawings, forming part hereof, wherein—

Figure 1 is a central section of a gearing embodying my invention. Fig. 2 is a cross-section on the plane of the line 2 2 in Fig. 1 looking in the direction of the arrows; and Fig. 3 is a side view, partly in section.

In the accompanying drawings the numeral 1 indicates a driving part, which is secured, as by a key, upon a hollow shaft or sleeve 2, that is mounted to rotate freely upon a shaft 3, which may be supported in suitable bearings, (not shown,) and upon the shaft 3 is a hollow shaft or sleeve $3^a$, which may also be supported in suitable bearings. (Not shown.) The parts 3 $3^a$ are in the present illustration of my invention the main parts to be driven, and they may respectively be attached to the driving-wheels of a motor-carriage or automobile.

The transmission or reversing gearing which I have shown is as follows:

4 is a support or disk secured upon shaft or sleeve 2 and shown provided with a hub $4^a$, keyed to said shaft 2, and 5 is a cam-sleeve or the like adapted to slide upon hub $4^a$.

6 is a disk mounted to rotate freely upon shaft 2 and provided with a flange $6^a$, the parts 4, 6, and $6^a$ forming a chamber within which an expansible split friction-ring 7 is located, adapted to frictionally engage the flange $6^a$, being shown connected with the support 4 by a screw 8, 9 being a spreader located between the ends of ring 7 and secured to an arm 10, that extends over the shaft 3 in position to be moved outwardly by the sleeve 5 to cause the part 9 to expand the ring 7 to lock the parts 4 and 6 together; but any suitable means may be provided for locking the parts together, if preferred. The disk or member 6 is to be held from rotation at certain times, which may be done by a brake-band 11, fitting within the peripheral groove $6^b$, any well-known means being utilized for supporting and operating said band.

To the disk or member 6 are connected one or more pinions or gears 12, shown mounted upon a pivot or spindle 13, carried by the member 6, and in mesh with a gear 14 on shaft 2, and the pinion or pinions 14 also mesh with an internal rack 15, that is carried by or formed on an annular or ring-like member 16, the member 16 being shown surrounding a bushing 17, encircling shaft 2. The ring or member 16 is secured to a support or member 18, that is primarily to be operated in reverse directions, as the case may require. The member 16 is shown provided with a projection $16^b$, secured to the member 18 by a screw 19, there being any suitable number of such projections and screws, preferably three. By this means a space is provided between the ring or annular member 16 and the member 18 in which one or more pinions or gears 20 are located and supported by spindles or pivots 21, shown connected at the ends to both members 16 and 18, whereby a firm support for said pivots is afforded and said members are rigidly connected. The pinions or gears 20 are in mesh with a gear 22 on shaft 2, and the pinions 20 are also in mesh with an annular rack 23, which may be separate from and secured to or made integral with a ring $23^a$, which is guided to rotate around the member 16, the latter being provided with an annular guideway for the purpose. The member 16 is also shown provided with a radially-disposed surface 16ᶜ, lying between the pinion 12 and ring 23ª, and thus the parts 23 23ª are guided to rotate between parts 16ᶜ and 18. The rack 23 is adapted to be held from rotation at certain times, and for this purpose is shown provided with a peripheral groove 23ᵇ, adapted to receive a brake-band 24, which may be supported and operated in any well-known manner.

By means of the parts above described it will be understood that when the support 6 is frictionally connected with shaft 2 the part 18 will rotate in the same direction as the shaft and at the same speed, because the intermediate parts will all be locked together; but if the friction is not set the rack 23 will be held from rotation by the brake-band 24 and shaft 2 will rotate pinion 20 on its axis by means of gear 22, and thereupon said pinion will travel at a relatively slow speed within rack 23 in the direction of rotation of shaft 2, carrying around with it the member 18 and the parts to be driven, thereby producing a relatively slow speed of part 18 in the direction of rotation of shaft 2. When it is desired to reverse the direction of rotation of part 18, the member 6 will be held from rotation while the friction device is disconnected therefrom, and thereupon the gear 14 will rotate the pinion 12 upon its axis and the latter will cause rack 16 to rotate oppositely to the direction of rotation of shaft 2, the part 18 and the parts to be driven thereby being correspondingly rotated. The pinion 20 at this time rotates freely on its axis and causes the rack 23 to rotate freely, whereby no interference in the gearing occurs.

The parts 3 and 3ª are connected with the part 18 by differential gearing, and for this purpose I have shown a bevel-gear 25 secured upon shaft 2, as by a key 25ª, the hub of the part 18 being shown journaled upon the hub of gear 25, and to the part 3ª is secured a gear 26, as by a key 26ª, and to the part 18 is secured a frame or housing 27, that is shown provided with a hub 27ª, journaled on the hub of gear 26. The frame or housing 27 is shown provided with a removable portion 27ᵇ, having a rim 27ᶜ lying within a flange 27ᵈ, screws 31 being shown as holding said parts 27 27ᵇ together. The gears 25 and 26 face each other, and interposed between them and meshing respectively therewith are one or more pinions 28, shown mounted upon spindles 29, suitably secured in hubs 30 or the like on frame 27. The frame or housing 27 incloses the differential gearing substantially dust-tight.

By the arrangement shown all the parts of the gearing are mounted substantially concentrically and in horizontal alinement upon shaft 3, the shafts 3 and 3ª being the main supporting-shafts of the device, and by having the support 18 journaled on the hub of gear 25 and the frame 27 journaled on the hub of gear 26 the parts are maintained in relative positions and the gears of the differential train are held in proper alinement. In whichever direction and at whichever speed the part 18 is rotated by the variable gearing the differential gearing will cause the parts 3 and 3ª to rotate in the same direction, and if either part 3 or 3ª meets a resistance then the other one will be enabled to rotate at such relative speed as may be necessary to compensate for the difference. By the arrangement shown all the parts are compact and the moving parts are contained within protecting-covers to exclude dust, and the entire gearing will be efficient in its operation.

I do not limit my invention to the details of construction shown and described, as they may be varied without departing from the spirit thereof.

Having now described my invention, what I claim is—

1. The combination of a driving part, a pair of driven parts, differential gearing connected therewith, means for locking the driving part in connection with the differential gearing, a rack connected with the differential gearing, means for rotating said rack by the driving part, a loose rack, a pinion in mesh therewith and connected with the differential gearing, means for rotating said pinion by the driving part, and means for limiting rotation of the loose rack, substantially as described.

2. The combination of a driving part, a member rotative independently thereof, a rack connected with said member, means for rotating said rack by the driving part, a loose rack, means to limit rotation thereof, gearing connecting said rack with the driving part and with said member, means for locking the driving part in connection with said member, a pair of driven parts, and differential gearing connecting said parts with said member, substantially as described.

3. The combination of a shaft, a sleeve surrounding the same, differential gearing connecting said shaft and sleeve, a hollow shaft surrounding said first-mentioned shaft, a driving part connected with the hollow shaft, gearing connecting the hollow shaft with the differential gearing, and gearing connecting the hollow shaft with the differential gearing to rotate the latter in a direction reverse to the direction of rotation of the hollow shaft, substantially as described.

4. The combination of a shaft, a sleeve surrounding the same, differential gearing connecting said shaft and sleeve, a hollow shaft surrounding said first-mentioned shaft, a driving part connected with the hollow shaft, gearing connecting the hollow shaft with the differential gearing, gearing connecting the hollow shaft with the differential gearing to rotate the latter in a direction reverse to the direction of rotation of the hollow shaft, and means for locking the hollow shaft in connection with the second-mentioned gearing to rotate the latter and the differential gearing at the same speed as the hollow shaft, substantially as described.

5. The combination of a shaft, and a sleeve surrounding the same, differential gearing connecting them, a frame or housing supporting the pinions of said gearing, a rotative member connected with said frame or housing and mounted concentrically around said shaft, gearing to rotate said member in one direction, gearing for rotating said member in the opposite direction, a driving part for operating said gearing, and means for locking the driving part in connection with said member to rotate them at the same speed, substantially as described.

6. The combination of a shaft, a sleeve surrounding the same, a gear secured to said shaft and provided with a hub, a gear secured to said sleeve and provided with a hub, a member journaled on the hub of the first-mentioned gear, a housing secured to said member and journaled on the hub of the second-mentioned gear, one or more pinions carried by said housing in mesh with said gears, gearing for rotating said member in one direction, gearing for rotating said member in the reverse direction, and a driving part for operating said gearing, substantially as described.

7. The combination of a shaft, a sleeve surrounding the same, a gear secured to said shaft and provided with a hub, a gear secured to said sleeve and provided with a hub, a member journaled on the hub of the first-mentioned gear, a housing secured to said member and journaled on the hub of the second-mentioned gear, one or more pinions carried by said housing in mesh with said gears, gearing for rotating said member in one direction, gearing for rotating said member in the reverse direction, and a driving part for operating said gearing, and means for locking said driving part in connection with said member to rotate them at the same speed.

COLCORD UPTON.

Witnesses:
SAMUEL H. STONE,
T. F. BOURNE.